(12) United States Patent
Hirai et al.

(10) Patent No.: US 11,951,806 B2
(45) Date of Patent: Apr. 9, 2024

(54) VEHICLE-MOUNTED TEMPERATURE CONTROLLER

(71) Applicant: TOYOTA JIDOSHA KABUSHIKI KAISHA, Toyota (JP)

(72) Inventors: Takuya Hirai, Mishima (JP); Hidefumi Aikawa, Shizuoka-ken (JP); Yuji Miyoshi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 863 days.

(21) Appl. No.: 17/036,779

(22) Filed: Sep. 29, 2020

(65) Prior Publication Data
US 2021/0101448 A1  Apr. 8, 2021

(30) Foreign Application Priority Data
Oct. 3, 2019   (JP) ................................. 2019-183195

(51) Int. Cl.
*B60H 1/22*     (2006.01)
*B60H 1/00*     (2006.01)
*B60H 1/32*     (2006.01)

(52) U.S. Cl.
CPC ............... *B60H 1/22* (2013.01); *B60H 1/00* (2013.01); *B60H 1/00328* (2013.01);
(Continued)

(58) Field of Classification Search
CPC ........ B60H 1/22; B60H 1/00; B60H 1/00328; B60H 1/00428; B60H 1/00792;
(Continued)

(56) References Cited

U.S. PATENT DOCUMENTS 3,466,888 A * 9/1969 Kyle .................... F25B 47/025
                                                      62/160
4,638,643 A * 1/1987 Sakazume ............. F25B 49/025
                                                     318/436
(Continued)

FOREIGN PATENT DOCUMENTS

AU       2012202535 A1 * 12/2012 ............. F24F 1/0003
CA          2514433 A1 *  8/2006 ......... B60H 1/00421
(Continued)

OTHER PUBLICATIONS

"17036779, IPSummaryTable-2024-01-23.pdf", ProQuest / Innovation Q+ Search, ip.com, Jan. 23, 2024.*

*Primary Examiner* — Steven B Mcallister
*Assistant Examiner* — Daniel E. Namay
(74) *Attorney, Agent, or Firm* — Sughrue Mion, PLLC

(57) ABSTRACT

A vehicle-mounted temperature controller 100 provided with a compressor 2 having a compression part 2a compressing a refrigerant and a drive motor 2b driving the compression part 2a and using waste heat accompanying driving of the compression part 2a to make the temperature of the refrigerant rise, a blower 61 blowing air to a heater core 145 raised in temperature by receiving heat of the refrigerant and blowing air exchanged in heat with the heater core 145 to the inside of the passenger compartment, and an electronic control unit 51 controlling a current phase of the drive motor 2b to a phase by which a ratio of change of an output of the drive motor 2b to a change of the current phase becomes relatively larger to thereby drive the drive motor 2b by an inefficient drive operation when the blower 61 is in a nondriven state and controlling the current phase to a phase by which a ratio of change of an output of the drive motor 2b to a change of the current phase becomes relatively smaller to thereby drive the drive motor 2b by an ineffi-
(Continued)

ciently drive operation when the blower 61 is in a driven state.

8 Claims, 9 Drawing Sheets

(52) U.S. Cl.
CPC ..... B60H 1/00428 (2013.01); B60H 1/00792 (2013.01); B60H 1/3226 (2013.01); B60H 1/3227 (2013.01); *B60H 2001/003* (2013.01); *B60H 2001/00614* (2013.01); *B60H 2001/225* (2013.01); *B60H 2001/229* (2013.01)

(58) Field of Classification Search
CPC ........................... B60H 1/3226; B60H 1/3227; B60H 1/00278; B60H 1/3211; B60H 2001/003; B60H 2001/00614; B60H 2001/225; B60H 2001/229; B60H 2001/00307; B60H 2001/224; B60H 2001/3255; B60H 2001/3257; B60H 2001/3263; B60H 2001/3264; F24D 2200/29; F24D 2200/31; F25B 27/02; F25B 2309/1411
USPC ......................................... 237/2 A, 12.3 B, 5
IPC .................. B60H 1/22,1/00, 1/00328, 1/00428, 1/00792, 1/3226, 1/3227, 1/00278, 1/3211, 2001/003, 2001/00614, 2001/225, 2001/229, 2001/00307, 2001/224, 2001/3255, 2001/3257, 2001/3263, 2001/3264; F24D 2200/29, 2200/31; F25B 13/00, 27/02, 49/022, 49/025, 2309/1411, 2313/027, 2313/0271, 2313/0272, 2600/02, 2600/021, 2600/022, 2600/024, 2600/025, 2600/0253, 2600/151, 2700/151, 2700/171, 2700/05

See application file for complete search history.

(56) References Cited

U.S. PATENT DOCUMENTS

| | | | | |
|---|---|---|---|---|
| 4,893,479 | A | * | 1/1990 | Gillett .................. F25B 49/025 |
| | | | | 318/807 |
| 2021/0101448 | A1 | * | 4/2021 | Hirai .................... B60H 1/3226 |

FOREIGN PATENT DOCUMENTS

| | | | | | |
|---|---|---|---|---|---|
| CA | 3079079 | A1 | * | 5/2019 | ......... B60H 1/00378 |
| CN | 1286747 | A | * | 3/2001 | ............ F25B 49/022 |
| CN | 110254161 | A | * | 9/2019 | ......... B60H 1/00271 |
| DE | 112014002644 | T5 | * | 2/2016 | ................ B60H 1/00 |
| EP | 0283954 | A2 | * | 7/2017 | .............. F25B 40/06 |
| EP | 3425307 | A1 | * | 1/2019 | .............. F25B 25/00 |
| GB | 2273617 | A | * | 6/1994 | ............ F25B 49/025 |
| JP | 2010-106807 | A | | 5/2010 | |
| JP | 5721875 | B1 | * | 5/2015 | ................ F25B 1/00 |

\* cited by examiner

VEHICLE-MOUNTED TEMPERATURE CONTROLLER

FIELD OF THE INVENTION

The present disclosure relates to a vehicle-mounted temperature controller.

BACKGROUND OF THE INVENTION

In the past, Japanese Unexamined Patent Publication No. 2010-106807 proposed, as a compressor used for a refrigeration circuit through which an air-conditioning refrigerant is circulated, a compressor of a type with an integrated inverter motor configured integrally holding a compression part compressing a refrigerant taken into a hermetic container, an electric motor driving this compression part, and a drive circuit driving this electric motor and configured to be able to exchange heat between the electric motor or a heat emitting part in the drive circuit and a intake side refrigerant and proposed a vehicle-mounted air-conditioner provided with such a compressor. Further, this vehicle-mounted air-conditioner is provided with a centrifugal fan (blower) blowing air to a heat exchanger through which refrigerant raised in temperature flows and blowing air exchanged in heat with the refrigerant at the heat exchanger to the inside of a passenger compartment.

The art described in Japanese Unexamined Patent Publication No. 2010-106807 supplies power to a drive circuit to drive the electric motor to thereby cause the electric motor to generate heat and cause the transistors forming the inverter in the drive circuit to generate heat to contribute to the rise in temperature of the refrigerant.

SUMMARY OF THE INVENTION

In this regard, in using the above-mentioned such vehicle-mounted air-conditioner to heat the passenger compartment, the vehicle-mounted air-conditioner can be set to the two states of a state where the electric motor is driven without the blower performing a blowing operation so as to raise the temperature of the refrigerant etc. and a state where the electric motor is driven for raising the temperature of the inside of the passenger compartment and where air heated by high temperature refrigerant is blown in by the blower. When the blower is not performing a blowing operation, it is necessary to increase the amount of heat generated by the electric motor for raising the temperature of the refrigerant etc. On the other hand, when the blower is performing a blowing operation, it is necessary to accurately control the output of the electric motor, that is, the output of the compressor, to a target value so as to suitably control the temperature of the inside of the passenger compartment. However, in the vehicle-mounted air-conditioner described in this patent literature, it was not possible to suitably control the amount of heat generated by the electric motor and the precision of control of output in accordance with any blowing operation by the blower.

In view of the above technical problem, an object of the present disclosure is to provide a vehicle-mounted temperature controller able to suitably control the amount of heat generated by an electric motor and the precision of control of output in accordance with any blowing operation by a blower.

The present invention was made so as to solve the above problem and has as its gist the following.

(1) A vehicle-mounted temperature controller comprising:
a compressor having a compression part compressing a refrigerant and a drive motor driving the compression part and using waste heat accompanying driving of the drive motor to make the temperature of the refrigerant rise,
a blower blowing air to a heat exchanger raised in temperature by receiving heat of the refrigerant and blowing air exchanged in heat with the heat exchanger to the inside of the passenger compartment, and
a motor control part controlling a current phase of the drive motor to a phase by which a ratio of change of an output of the drive motor to a change of the current phase becomes relatively larger to thereby drive the drive motor by an inefficient drive operation when the blower is in a nondriven state and controlling the current phase to a phase by which a ratio of change of an output of the drive motor to a change of the current phase becomes relatively smaller to thereby drive the drive motor by an inefficient drive operation when the blower is in a driven state.

(2) The vehicle-mounted temperature controller according to above (1), wherein
the motor control part drives the drive motor by the inefficient drive operation by controlling the current phase of the drive motor to an advanced side from the optimum phase when the blower is in the nondriven state and controlling the current phase of the drive motor to a retarded side from the optimum phase when the blower is in the driven state and
the optimum phase is a phase by which an output of the drive motor can satisfy a demanded torque of the compressor while the current supplied to the drive motor can be minimized.

(3) The vehicle-mounted temperature controller according to above (2), wherein the blower is set to the nondriven state at the time of heating demand, then is set to the driven state in accordance with a temperature rise of the refrigerant.

(4) The vehicle-mounted temperature controller according to above (2), wherein the motor control part makes the current phase of the drive motor approach the optimum phase after controlling it to the retarded side from the optimum phase.

(5) The vehicle-mounted temperature controller according to above (1), wherein, when performing the inefficient drive operation, the motor control part supplies to the drive motor a current larger than a smallest current value in the currents supplied to the drive motor by which the output of the drive motor can satisfy a demanded torque of the compressor.

(6) The vehicle-mounted temperature controller according to above (1), wherein
the temperature controller further comprises a temperature detector detecting a temperature of the refrigerant, and
the motor control part inefficiently drives the drive motor so long as the temperature of the refrigerant is a predetermined value or less.

(7) The vehicle-mounted temperature controller according to above (6), wherein the motor control part drives the drive motor by the inefficient drive operation so long as the temperature of the refrigerant is the predetermined value or less and there is heating demand.

(8) The vehicle-mounted temperature controller according to above (1), wherein the compressor is configured to be able to exchange heat between the drive motor or a heat emitting part emitting heat along with driving of the drive motor and a refrigerant.

According to the present disclosure, a vehicle-mounted temperature controller able to suitably control the amount of heat generated by an electric motor and the precision of control of output in accordance with any blowing operation by a blower is provided.

DESCRIPTION OF EMBODIMENTS

Below, embodiments will be explained in detail with reference to the drawings. Note that, in the following explanation, similar component elements are assigned the same reference notations.

Configuration of Vehicle-Mounted Temperature Contoller

Figure 1:
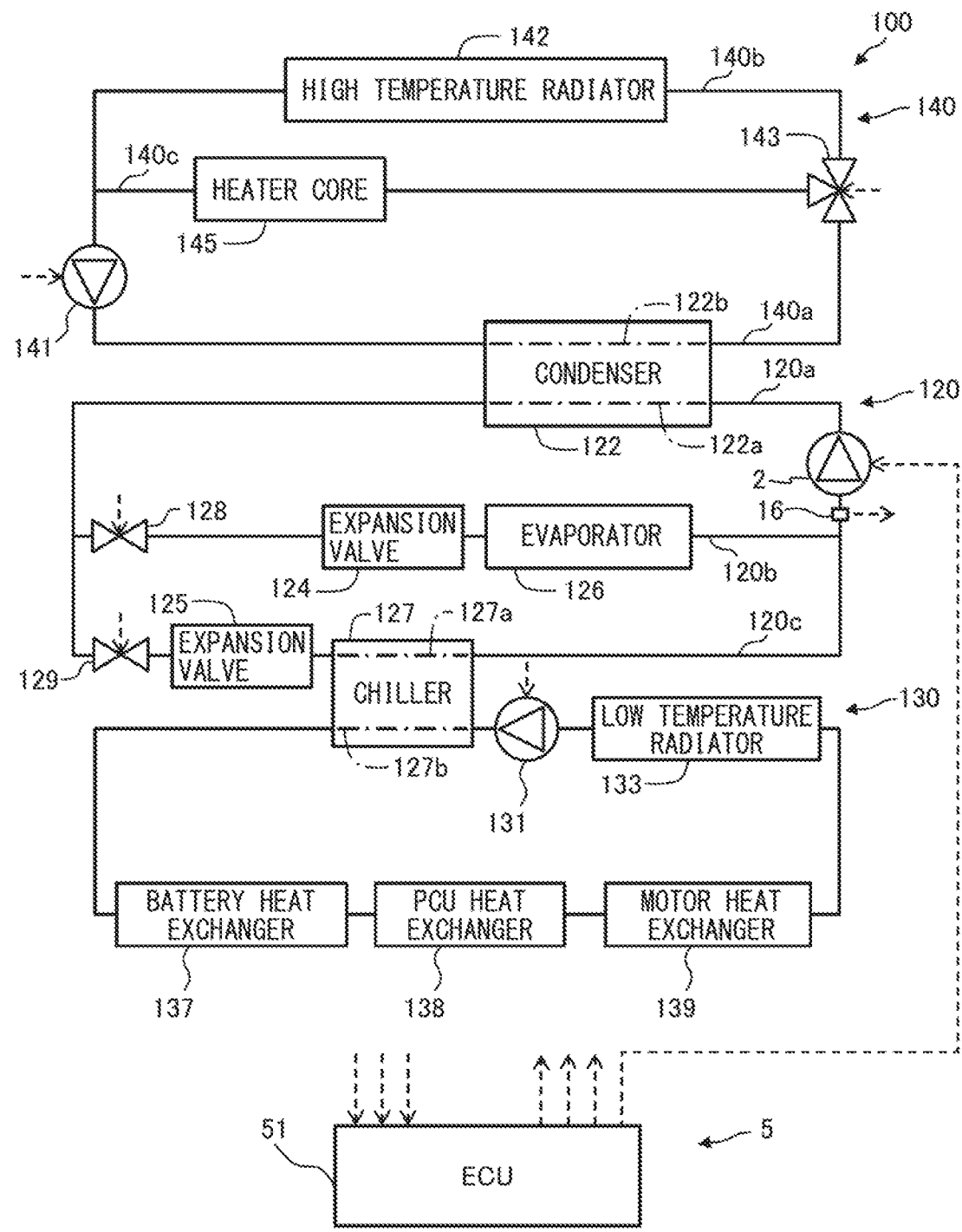
FIG. 1 is view of the configuration schematically showing a vehicle-mounted temperature controller.
Figure 2:
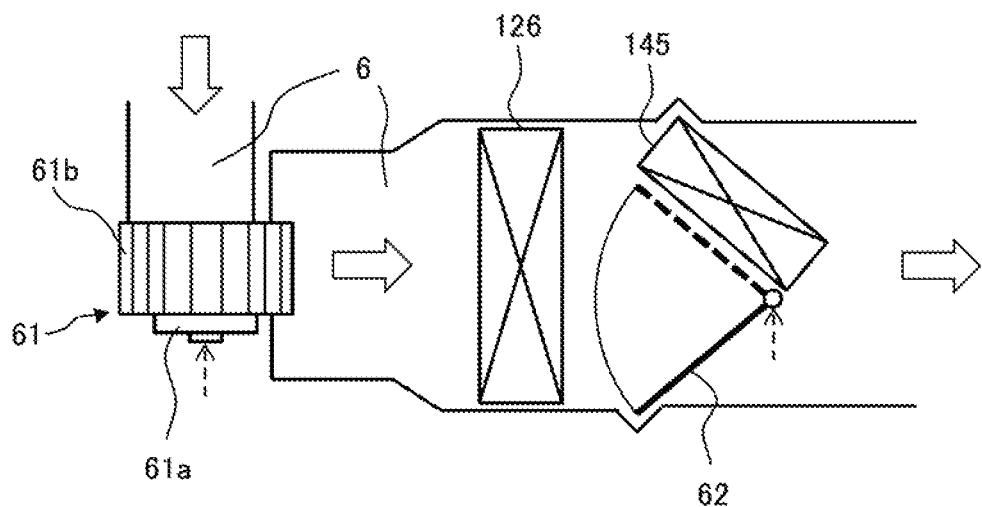
FIG. 2 is a view of the configuration schematically showing an air passage for air-conditioning a vehicle mounting a vehicle-mounted temperature controller.

Referring to FIG. 1 and FIG. 2, the configuration of a vehicle-mounted temperature controller 100 according to one embodiment will be explained. FIG. 1 is view of the configuration schematically showing the vehicle-mounted temperature controller 100. The vehicle-mounted temperature controller 100 is provided with a refrigeration circuit 120, low temperature circuit 130, and high temperature circuit 140 and is configured so that these circuits exchange heat with each other. In the vehicle-mounted temperature controller 100, in the heating operation mode, the heater core 145 of the high temperature circuit 140 discharges heat to heat the inside of a passenger compartment and, in the cooling operation mode or dehumidification operation mode, the evaporator 126 absorbs heat to cool and dehumidify the inside of the passenger compartment.

Further, the vehicle-mounted temperature controller 100 transfers heat from the low temperature circuit 130 to the refrigeration circuit 120 to cool the heat emitting devices by the low temperature circuit 130. The low temperature circuit 130 cools a motor-generator (MG) driving an electric vehicle or regenerating energy when braking the electric vehicle, a power control unit (PCU) controlling the electric power supplied to the motor-generator, a battery supplying electric power to the motor-generator etc., and other heat emitting devices.

In FIG. 1, the refrigeration circuit 120 is provided with a compressor 2, refrigerant piping 122a of the condenser 122, first expansion valve 124, second expansion valve 125, evaporator 126, refrigerant piping 127a of the chiller 127, first adjusting valve 128, and second adjusting valve 129. The refrigeration circuit 120 is configured to realize a refrigeration cycle by making a refrigerant circulate through these component parts.

The refrigeration circuit 120 is divided into a refrigeration basic flow path 120a, evaporator flow path 120b, and chiller flow path 120c. The evaporator flow path 120b and chiller flow path 120c are provided in parallel with each other and are respectively connected to the refrigeration basic flow path 120a.

The refrigeration basic flow path 120a is provided with the compressor 2 and refrigerant piping 122a of the condenser 122 in that order in the direction of circulation of the refrigerant. The evaporator flow path 120b is provided with the first adjusting valve 128, first expansion valve 124, and evaporator 126 in that order in the direction of circulation of the refrigerant. In addition, the chiller flow path 120c is provided with the second adjusting valve 129, second expansion valve 125, and chiller 127 in that order.

The refrigerant flows in the refrigeration basic flow path 120a without regard as to operation of the first adjusting valve 128 and second adjusting valve 129. If the refrigerant flows to the refrigeration basic flow path 120a, the refrigerant flows through the compressor 2 and the refrigerant piping 122a of the condenser 122 in that order of the components. The refrigerant flows to the evaporator flow path 120b when the first adjusting valve 128 is opened. If the refrigerant flows to the evaporator flow path 120b, the refrigerant flows through the first adjusting valve 128, the first expansion valve 124, and the evaporator 126 in that order of the components. The refrigerant flows to the chiller flow path 120c when the second adjusting valve 129 is opened. If the refrigerant flows to the chiller flow path 120c, the refrigerant flows through the second adjusting valve 129, second expansion valve 125, and chiller 127 in that order of the components.

In the compressor 2, a low temperature and low pressure mainly gaseous refrigerant flowing out from the evaporator 126 or chiller 127 is adiabatically compressed, whereby it is made to change to a high temperature and high pressure mainly gaseous refrigerant. At the upstream side of the compressor 2, a temperature sensor 16 is provided for detecting the temperature of the refrigerant. Note that, the position of the temperature sensor 16 is not limited to the position of FIG. 1.

The condenser 122 is provided with the refrigerant piping 122a and cooling water piping 122b. The condenser 122 functions as a heat exchanger making the refrigerant discharge heat to the cooling water of the high temperature circuit 140 to make the refrigerant condense. The condenser 122 exchanges heat between the refrigerant flowing through the refrigerant piping 122a and the cooling water flowing through the later explained cooling water piping 122b and transfers heat from the refrigerant to this cooling water. The refrigerant piping 122a of the condenser 122 functions as a condenser making the refrigerant condense in the refrigeration cycle. Further, in the refrigerant piping 122a of the condenser 122, the high temperature and high pressure mainly gaseous refrigerant flowing out from the compressor 2 is isobarically cooled whereby it is made to change to a high temperature and high pressure mainly liquid refrigerant.

The first expansion valve 124 and second expansion valve 125 function as expanders making the refrigerant expand. These expansion valves 124, 125 are provided with narrow diameter passages and eject refrigerant from the narrow diameter passages to make the pressure of the refrigerant rapidly fall. The first expansion valve 124 sprays the liquid refrigerant supplied from the condenser 122 to the inside of the evaporator 126 in an atomized state. Similarly, the second expansion valve 125 sprays the liquid refrigerant supplied from the condenser 122 to the inside of the refrigerant piping 127a of the chiller 127 in an atomized state. In these expansion valves 124 and 125, the high temperature and high pressure liquid refrigerant flowing out from the condenser 122 is reduced in pressure and partially vaporized to thereby be changed to a low temperature and low pressure atomized refrigerant.

The evaporator 126 functions as an evaporator for making the refrigerant evaporate. Specifically, the evaporator 126 makes the refrigerant absorb heat from the air around the evaporator 126 and makes the refrigerant evaporate. Therefore, in the evaporator 126, the low temperature and low pressure atomized refrigerant flowing out from the first expansion valve 124 is evaporated to thereby make it change to a low temperature and low pressure gaseous refrigerant. As a result, the air around the evaporator 126 can be cooled to cool the inside of the passenger compartment.

The chiller 127 is provided with the refrigerant piping 127a and the cooling water piping 127b. The chiller 127 functions as a heat exchanger making the refrigerant absorb heat from the cooling water of the later explained low temperature circuit 130 and making the refrigerant evaporate. The chiller 127 exchanges heat between the cooling water flowing through the later explained cooling water piping 127b and the refrigerant flowing through the refrigerant piping 127a and transfers heat from this cooling water to the refrigerant. As a result, the cooling water of the low temperature circuit 130 is made to cool. The refrigerant piping 127a of the chiller 127 functions as an evaporator making the refrigerant evaporate. In the refrigerant piping 127a of the chiller 127, the low temperature and low pressure atomized refrigerant flowing out from the second expansion valve 125 evaporates whereby it is made to change to a low temperature and low pressure gaseous refrigerant.

The first adjusting valve 128 and second adjusting valve 129 are used so as to change the mode of circulation of the refrigerant inside the refrigeration circuit 120. The larger the opening degree of the first adjusting valve 128, the greater the refrigerant flowing into the evaporator flow path 120b and accordingly the greater the refrigerant flowing into the evaporator 126. Further, the larger the opening degree of the second adjusting valve 129, the greater the refrigerant flowing into the chiller flow path 120c and accordingly the greater the refrigerant flowing into the chiller 127.

The low temperature circuit 130 is provided with a pump 131, the cooling water piping 127b of the chiller 127, and low temperature radiator 133. In addition, the low temperature circuit 130 is provided with a battery heat exchanger 137, PCU heat exchanger 138, and motor heat exchanger 139. In the low temperature circuit 130, cooling water circulates through these components.

The pump 131 pumps cooling water circulating through the inside of the low temperature circuit 130. The low temperature radiator 133 is a heat exchanger exchanging heat between the cooling water circulating through the inside of the low temperature circuit 130 and the air at the outside of the vehicle (outside air). The low temperature radiator 133 is configured so as to discharge heat to the outside air from the cooling water when the temperature of the cooling water is higher than the temperature of the outside air, while to absorb heat from the outside air at the cooling water when the temperature of the cooling water is lower than the temperature of the outside air.

The battery heat exchanger 137 has the function of exchanging heat with the battery of the vehicle as a beat emitting device. Further, the PCU heat exchanger 138 has the function of exchanging heat with a power control unit of a vehicle as a heat emitting device. Note that, the PCU is connected between the battery and motor-generator and controls the electric power supplied to the motor-generator. The PCU has an inverter driving the motor-generator, a booster converter controlling the voltage, a DCDC converter lowering a high voltage, and other heat emitting parts. Further, the motor heat exchanger 139 has the function of exchanging heat with the motor-generator of a vehicle as a heat emitting device.

The high temperature circuit 140 is provided with a pump 141, cooling water piping 122b of the condenser 122, high temperature radiator 142, three-way valve 143, and heater core 145. In the high temperature circuit 140, cooling water is circulated through these component parts.

Further, the high temperature circuit 140 is divided into a high temperature basic flow path 140a, radiator flow path 140b, and heater flow path 140c. The radiator flow path 140b and the heater flow path 140c are provided in parallel with each other and are respectively be connected to the high temperature basic flow path 140a.

The high temperature basic flow path 140a is provided with the pump 141 and cooling water piping 122b of the condenser 122 in that order in the direction of circulation of the cooling water. The radiator flow path 140b is provided with the high temperature radiator 142. Further, the heater flow path 140c is provided with the heater core 145. Among the high temperature basic flow path 140a, radiator flow path 140b, and heater flow path 140c, a three-way valve 143 is provided.

The pump 141 pumps cooling water circulating through the inside of the high temperature circuit 140. The high temperature radiator 142, in the same way as the low temperature radiator 133, is a heat exchanger exchanging heat between the cooling water circulating through the inside of the high temperature circuit 140 and the outside air.

The three-way valve 143 is configured to control the mode of flow of the cooling water flowing out from the cooling water piping 122b of the condenser 122 and selectively change the destination of flow between the radiator flow path 140b and the heater flow path 140c. If the three-way valve 143 is set to the radiator flow path 140b side, the cooling water flowing out from the cooling water piping 122b of the condenser 122 flows through the radiator flow path 140b. On the other hand, if the three-way valve 143 is set to the heater flow path 140c side, the cooling water flowing out from the cooling water piping 122b of the condenser 122 flows through the heater core 145.

The heater core 145 exchanges heat between the cooling water circulating through the inside of the high temperature circuit 140 and the air around the heater core 145 and is configured to heat the inside of the passenger compartment. Specifically, the heater core 145 is configured to discharge heat from the cooling water to the air around the heater core 145. Therefore, if high temperature cooling water flows to the heater core 145, the temperature of the cooling water falls and the air around the heater core 145 is warmed.

FIG. 2 is a view of the configuration schematically showing an air passage 6 for air conditioning use of a vehicle mounting the vehicle-mounted temperature controller 100. In the air passage 6, air flows in the direction shown by the arrow in the figure. The air passage 6 shown in FIG. 2 is connected to the outside of the vehicle or an air intake port of the passenger compartment. The outside air or the air inside of the passenger compartment flows into the air passage 6 in accordance with the state of control by the control device 5. Further, the air passage 6 shown in FIG. 2 is connected to vents blowing air to the inside of the passenger compartment. The air passage 6 supplies air to any vent among them in accordance with the state of control by the control device 5.

As shown in FIG. 2, the air passage 6 for air-conditioning use of the present embodiment is provided with a blower 61, evaporator 126, air mix door 62, and heater core 145 in that order in the direction of flow of air.

The blower 61 is provided with a blower motor 61a and a blower fan 61b. The blower 61 is configured so that if the blower motor 61a drives the blower fan 61b, the outside air or the air inside of the passenger compartment flows into the air passage 6 and the air flows through the air passage 6.

The air mix door 62 is configured to enable adjustment among a fully open state where all of the air flowing through the air passage 6 flows through the heater core 145 and a fully closed state where none of the air flowing through the air passage 6 flows through the heater core 145 and states between them. Due to this, the blowing temperature of the air blown to the inside of the passenger compartment is adjusted.

In the heating operation mode or dehumidification operation mode, when the blower 61 is driven, the cooling water is circulated in the heater core 145 and the air mix door 62 is controlled so that the air flows through the heater core 145 whereby air flowing through the inside of the air passage 6 is warmed. Further, in the cooling operation mode or dehumidification operation mode, when the blower 61 is driven, refrigerant circulates to the evaporator 126 and the air flowing through the air passage 6 is cooled and dehumidified.

Figure 3:
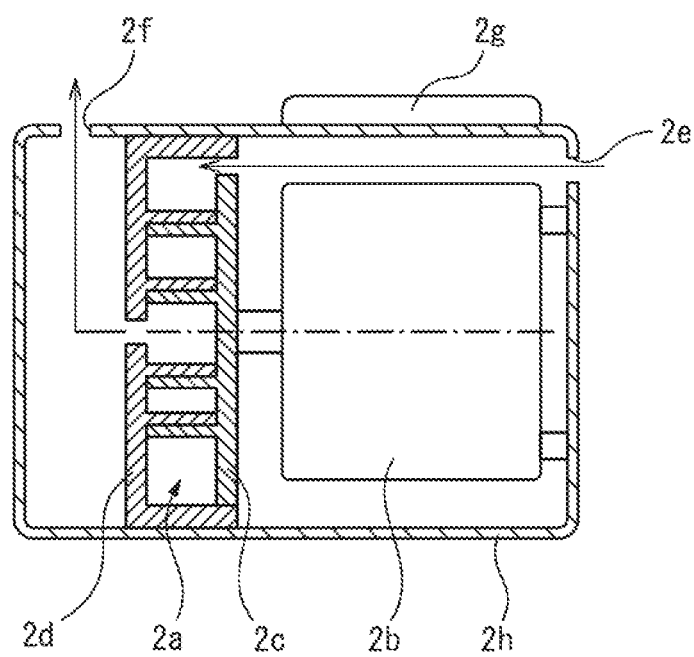
FIG. 3 is a schematic view showing one example of the configuration of a compressor.

FIG. 3 is a schematic view showing one example of the configuration of the compressor 2. The compressor 2 has a compression part 2a compressing the intaken refrigerant and a drive motor 2b driving this compression part 2a. The compressor 2 is configured to make the temperature of the refrigerant at the intake side rise by the waste heat from the driver motor 2b accompanying drive of the compression part 2a. The compressor 2 may also be configured so as to make the temperature of the refrigerant at the intake side rise by not only the waste heat from the drive motor 2b but also the waste heat from the drive circuits 2g etc. such as the inverter for driving the drive motor 2b. Due to such a configuration, it is possible to raise the temperature of the refrigerant by the waste heat of the drive motor 2b and cool the drive motor 2b.

More specifically, the compressor 2 is configured by a housing 2h in which a compression part 2a compressing the intaken refrigerant and a drive motor 2b driving the compression part 2a are housed. The compressor 2 is configured to be able to exchange heat between the drive motor 2b and refrigerant taken into the compressor 2 from the intake port 2e. The compressor 2 may be configured to be able to exchange heat between not only the drive motor 2b, but also the heat emitting parts in the drive circuit 2g (inverter etc.) and the intake side refrigerant. The drive circuit 2g may also be held in the housing 2h. The compression part 2a uses the drive motor 2b to make the spiral body of the movable scroll member 2c rotate with respect to the spiral body of the fixed scroll member 2d and decrease the volume of the working chamber between the movable scroll member 2c and fixed scroll member 2d to thereby compress the refrigerant inside the working chamber. The refrigerant compressed by the compression part 2a is discharged from the discharge port 2f. Note that, as an example of the configuration of the compressor 2, for example, one configured as in the above Japanese Unexamined Patent Publication No. 2010-106807 may be employed.

Referring to FIG. 1, the control device 5 is provided with an electronic control unit (ECU) 51. The ECU 51 is provided with a processor performing various processings, a memory storing programs and various types of information, and an interface connected to various actuators or various sensors.

In FIG. 1, the adjusting valves 128 and 129, expansion valves 124 and 125, pumps 131 and 141, three-way valve 143, and air mix door 62 are respectively driven by actuators. The ECU 51 electrically controls the actuators of the vehicle-mounted temperature controller 100 plus the drive motor 2b of the compressor 2, the blower motor 61a, etc. based on operation information of various switches on a not shown A/C control panel, sensor signals from various sensors, and a control program stored in the memory. Note that, as the various switches on the A/C control panel, a temperature setting switch, an air-conditioner (A/C) switch, an intake port setting (outside air/inside air switching) switch, vent mode setting switch, defroster (DEF) switch, air flow setting switch, auto switch, off switch, etc, may be mentioned.

Further, the program in the ECU 51 obtains sensor signals of the corresponding outside air temperature, temperature inside the compartment, amount of sunlight, etc. by the various sensors mounted in the vehicle to and calculates the target blowing temperature as the heating load based on these data. Further, the ECU 51 calculates the difference between the set temperature set by for example a temperature setting switch at the A/C control panel and the target blowing temperature to control the operation corresponding to that difference and control the inside of the passenger compartment to the set temperature.

Operation of Vehicle-Mounted Temperature Controller

Next, the operation of the vehicle-mounted temperature controller 100 will be explained. Here, mainly the heating operation mode will be explained. In the heating operation mode, the refrigerant made to change to a high temperature and high pressure gaseous state by driving the compressor 2 discharges heat by exchanging heat with the cooling water circulating inside the high temperature circuit 140 when passing through the condenser 122. In the heating operation mode, the three-way valve 143 is set to the heater flow path 140c side whereby the cooling water flowing out from the cooling water piping 122b of the condenser 122 flows through the heater core 145.

Further, in the heating operation mode, the opening degree of the air mix door 62 is controlled to be fully opened. When the blower motor 61a drives the blower fan 61b, the outside air or the air inside of the passenger compartment flows into the air passage 6. The air flows through the air passage 6 and passes through the heater core 145. The heater core 145 exchanges heat between the cooling water circulating through the inside of the high temperature circuit 140 and the air around the heater core 145. Further, air passing through the heater core 145 is blown out from the vents to the inside of the passenger compartment whereby the inside of the passenger compartment is heated.

As explained above, in the heating operation mode, heat is transferred from the refrigeration circuit 120 to the high temperature circuit 140 to thereby heat the inside of the passenger compartment. On the other hand, at the time of a low temperature, the refrigerant temperature and the refrigerant density fall, so in the refrigeration circuit 120, sometimes the refrigeration cycle cannot be suitably realized. For this reason, in the present embodiment, the motor efficiency of the drive motor 2b of the compressor 2 is intentionally lowered and the amount of generation of heat by the drive motor 2b is made to increase whereby the refrigerant temperature and the refrigerant density are made to rise before compression by the compressor 2. By making the refrigerant temperature and refrigerant density rise before compression, it becomes possible to suitably realize the refrigeration cycle in the refrigeration circuit 120.

In more detail, in an environment of a temperature of the refrigerant so low that the refrigeration cycle cannot be suitably realized, the ECU 51 drives the drive motor 2b of the compressor 2 at an operating point different from the most efficient operating point for the demanded torque at that time so as to make the temperature of the refrigerant rise earlier (below, such a drive operation of the drive motor 2b will be called an "inefficient drive operation"). Note that, the ECU 51 sets the demanded torque of the drive motor 2b of the compressor 2 in accordance with the outside air temperature, temperature inside the compartment, refrigerant temperature, etc. By driving the drive motor 2b by an inefficient drive operation, the amount of heat generated by the drive motor 2b increases and the temperature of the refrigerant can be raised in a short time. By raising the temperature of the refrigerant earlier, in the refrigeration circuit 120, the refrigeration cycle can be suitably realized earlier and accordingly the inside of the passenger compartment can be warmed earlier.

Figure 4:
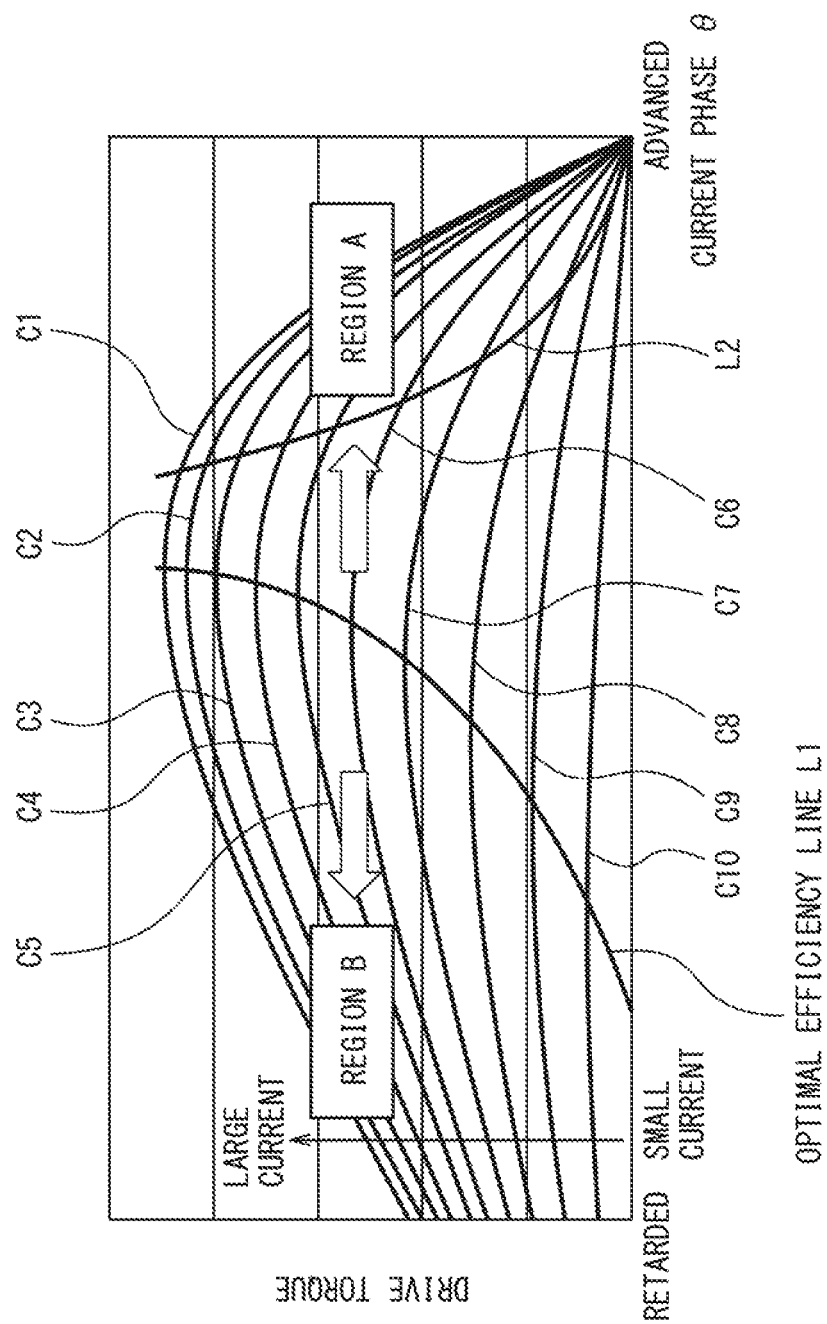
FIG. 4 is a graph showing a relationship between a torque of a drive motor of the compressor (ordinate) and a current phase θ of current flowing through the drive motor (abscissa).

FIG. 4 is a graph showing the relationship between the drive torque of the drive motor 2b of the compressor 2 (ordinate) and the current phase θ of the current flowing through the drive motor 2b (abscissa). As shown in FIG. 4, the relationship of the drive torque of the drive motor 2b and the current phase θ of the current flowing through the drive motor 2b is expressed by the characteristic curves C1 to C10. The characteristic curves C1 to C10 show characteristics when the motor currents are different from each other and show the characteristics when the current becomes larger in stages from C1 to C10. Therefore, the characteristic curve C1 is the characteristic when the current is the largest, while the characteristic curve C10 is the characteristic when the current is the smallest.

In each of the characteristic curves C1 to C10, the drive torque changes so as to become maximum at a certain current phase. At each characteristic curve, the operating point where the drive torque becomes largest is called the "maximum operating point". L1 in FIG. 4 shows the optimum efficiency line connecting the maximum operating points of the characteristic curves C1 to C10. At the operating points on the optimum efficiency line, it is possible to reduce the current supplied to the drive motor 2b the most for any drive torque. Therefore, normally, the current phase θ of the drive motor 2b is controlled so that the operating point of the drive motor 2b becomes an operating point on the optimum efficiency line for any drive torque. As a result, the motor efficiency can be maximized.

In each of the characteristic curves C1 to C10, if shifting the current phase θ from the phase on the optimum efficiency line L1 (below, referred to as "the optimum phase $\theta_0$"), the motor efficiency falls and accordingly the drive torque gradually decreases. In addition, if trying to maintain the drive torque at the demanded torque as the torque falls along with the drop in motor efficiency, the amount of heat generated at the drive motor 2b will increase. Note that, the "optimum phase $\theta_0$" means the phase by which the drive torque (output) of the drive motor 2b will satisfy the demanded torque while reducing the current supplied to the drive motor 2b the most.

In the present embodiment, in a situation where the refrigerant density falls at the time of low temperature and the refrigeration circuit 120 cannot be driven, the ECU 51 matches the drive torque of the drive motor 2b of the compressor 2 with the demanded torque while controlling the current phase θ of the drive motor 2b so that the efficiency of the drive motor 2b falls from the maximum efficiency. That is, the ECU 51 performs an inefficient drive operation driving the drive motor 2b by an operating point different from the most efficient operating point for the demanded torque under such circumstances. In other words, the ECU 51 supplies to the drive motor 2b a current larger than the smallest current in currents supplied to the drive motor by which the output of the drive motor can satisfy the demanded torque of the compressor.

In more detail, the ECU 51 makes the current value a current value larger than the current value at the time of the maximum operating point corresponding to the demanded torque and drives the drive motor 2b at an operating point shifted in current phase θ from the optimum phase $\theta_0$. Due to this, even if outputting the same drive torque, a larger electric power is consumed, so the motor efficiency can be reduced.

As a result, the electric power loss caused in the drive motor 2b becomes larger, so the amount of heat generated from the drive motor 2b increases. Therefore, the amount of heat transferred from the drive motor 2b to the refrigerant inside the compressor 2 can be increased more and the refrigerant is warmed faster. Further, the amount of generation of heat of the drive circuit 2g also increases, so when configured so that heat can be exchanged between the drive circuit 2g and the refrigerant, the amount of heat transferred from the drive circuit 2g to the refrigerant can be increased more as well.

FIG. 4 shows a region A shifting the current phase θ to the advanced side from the optimum efficiency line L1 and the region B shifting the current phase θ to the retarded side from the optimum efficiency line L1. Basically, by controlling what is controlled on the optimum efficiency line L1 at the region A or region B, it is possible to increase the current of the drive motor 2b and possible to generate waste heat at the compressor 2. Further, by using the waste heat to warm the refrigerant, the refrigerant density rises and compression of the refrigerant by the compressor 2 becomes possible. Therefore, the refrigeration circuit 120 can be driven even at the time of a low temperature.

In the region A of FIG. 4 (advanced side), at each of the characteristic curves C1 to C10, the amount of change of the drive torque with respect to a change of the current phase is large (inclination in figure is sharp). For this reason, in the region A of FIG. 4, it is possible to enlarge the drop in motor efficiency of the drive motor 2b accompanying a shift of the current phase θ from the optimum phase $θ_0$ and accordingly possible to increase the amount of generation of heat at the drive motor 2b. On the other hand, in the region A of FIG. 4, the change of the drive torque with respect to a change of the current phase θ is large (that is, the advance sensitivity is large), so management of the drive torque becomes relatively difficult. As a result, fluctuation easily occurs in the drive torque and accordingly when the blower 61 is driven for heating, temperature changes easily occur in the air discharged from the vents of the air passage 6. Note that, in the region A, the above inclination becomes sharp in the region at the further advanced side from the line L2.

Further, in the region B of FIG. 4 (retarded side), at each of the characteristic curves C1 to C10, the amount of change of the drive torque with respect to a change of the current phase is small (inclination in figure is gentle). For this reason, in the region B of FIG. 4, the drop in motor efficiency of the drive motor 2b accompanying a shift of the current phase θ from the optimum phase $θ_0$ is small and accordingly the amount of generation of heat at the drive motor 2b does not become that large. On the other hand, in the region B of FIG. 4, the change of the drive torque with respect to a change of the current phase θ is small (that is, the retardation sensitivity is small), so management of the drive torque becomes easy. Therefore, when the blower 61 is driven and heating is performed, it becomes harder for changes in temperature to occur in the air blown out from the vents of the air passage 6, so it becomes possible to improve the controllability of temperature of the inside of the passenger compartment.

As explained above, the characteristic of the inefficient drive operation differs between the case of shifting the current phase θ to the advanced side and shifting it to the retarded side. In the present embodiment, the control of the inefficient drive operation is changed in accordance with the characteristics of inefficient drive operation of the advanced side and retarded side and demand for control of the blower motor 61a driving rotation of the blower fan 61b.

In an environment of a low temperature of the refrigerant, if rendering the blower motor 61a the on state, cool air ends up being introduced inside of the passenger compartment. For this reason, if the temperature of the refrigerant is low, at the time heating is demanded, the blower motor 61a is set to the off state so that cool air is not introduced to the inside of the passenger compartment. If the temperature of the refrigerant rises and heating becomes possible, the blower motor 61a is set to the on state and warm air is introduced inside of the passenger compartment.

For this reason, in the state where the blower motor 61a is off, control is performed to shift the current phase θ to the advanced side from the optimum phase $θ_0$ so as to drive the drive motor 2b in the region A of FIG. 4. In other words, in the state where the blower motor 61a is off, the drive motor 2b is driven by an inefficient drive operation controlling the current phase θ to a phase by which the ratio of change of the output of the drive motor 2b with respect to the change of the current phase θ of the drive motor 2b becomes relatively larger. Due to this, it is possible to perform an inefficient drive operation in the state with a large drop in motor efficiency and the refrigerant temperature can be quickly raised. Further, the blower motor 61a is in the off state, so even if fluctuation occurs in the drive torque of the drive motor 2b, air changing in temperature will not be introduced to the inside of the passenger compartment. Therefore, change of temperature of the air inside the air passage 6 is kept from having an effect on the temperature of the inside of the passenger compartment.

Further, in the state where the blower motor 61a is on, control is performed to shift the current phase θ to the retarded side from the optimum phase $θ_0$ so as to make the drive motor 2b be driven in the region B of FIG. 4. In other words, in the state where the blower motor 61a is set on, the drive motor 2b is driven by an inefficient drive operation controlling the current phase θ to a phase by which the ratio of change of the output of the drive motor 2b with respect to the change of the current phase θ of the drive motor 2b becomes relatively small. Due to this, management of the drive torque becomes easy and it becomes harder for changes in temperature to occur in the air blown out from the vents of the air passage 6, so it becomes possible to improve the controllability of temperature of the inside of the passenger compartment. Further, the drive motor 2b is driven by an inefficient drive operation in the state with a small drop in the motor efficiency, but the refrigerant temperature rises to a certain extent by an inefficient drive operation when the blower motor 61a is set to the off state, so there is little effect due to the drop in the motor efficiency becoming small when driving the drive motor 2b by an inefficient drive operation.

In the above way, control is performed to change the control of the inefficient drive operation in accordance with the demand on control of the blower motor 61a to give priority to raising the temperature of the refrigerant when the blower motor 61a is set to the off state and to give priority to suppressing changes in temperature of the refrigerant when the blower motor 61a is set to the on state. The ECU 51 functions as the motor control part controlling the drive motor 2b. Further, the ECU 51 controls the on/off state of the blower motor 61a. The ECU 51 drives the drive motor 2b by an inefficient drive operation by controlling the current phase of the drive motor 2b of the compressor 2 to the advanced side or retarded side based on the on/off state of the blower motor 61a.

Note that, in the present embodiment, if the blower motor 61a is in the off state, the drive motor 2b is driven inside of the region A of FIG. 4. However, in this case, if possible to set the current phase of the drive motor 2b to a phase whereby the ratio of the change of output of the drive motor 2b to the change of the current phase of the drive motor 2b becomes relatively larger (compared with the case where the blower motor 61a is in the on state), the drive motor 2b may also be driven by an inefficient drive operation in a region other than the region A of FIG. 4. Further, in the present embodiment, when the blower motor 61a is in the on state, the drive motor 2b is driven in the region B of FIG. 4. However, in this case, if possible to set the current phase of the drive motor 2b to a phase whereby the ratio of the change of output of the drive motor 2b to the change of the current phase of the drive motor 2b becomes relatively smaller (compared with the case where the blower motor 61a is in the off state), the drive motor 2b may also be driven by an inefficient drive operation in a region other than the region B of FIG. 4.

Figure 5:
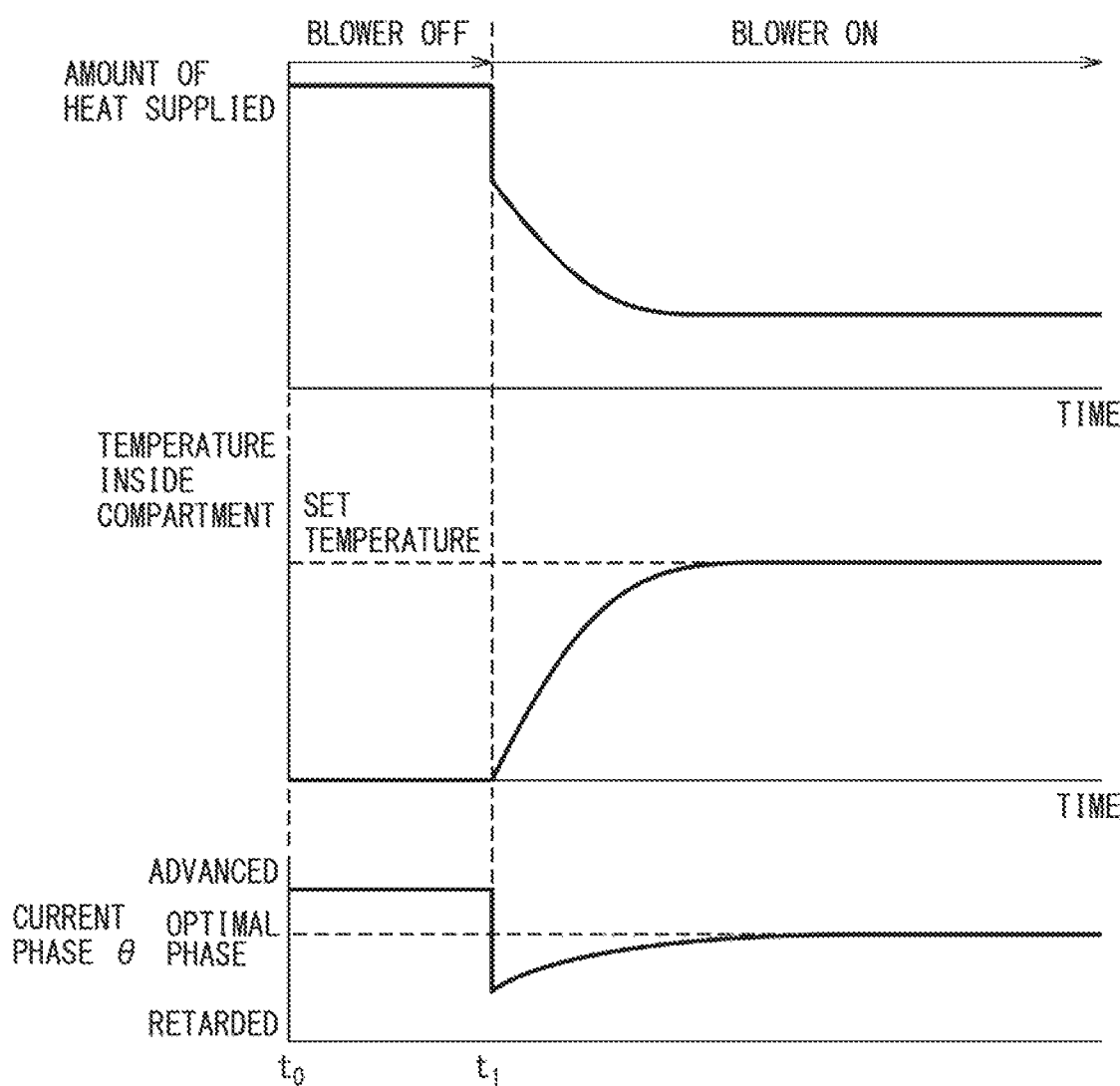
FIG. 5 is a graph showing a change along with time from the time of heating demand relating to an amount of heat which the drive motor supplies to the refrigerant, temperature inside a compartment, and current phase θ.
Figure 6:
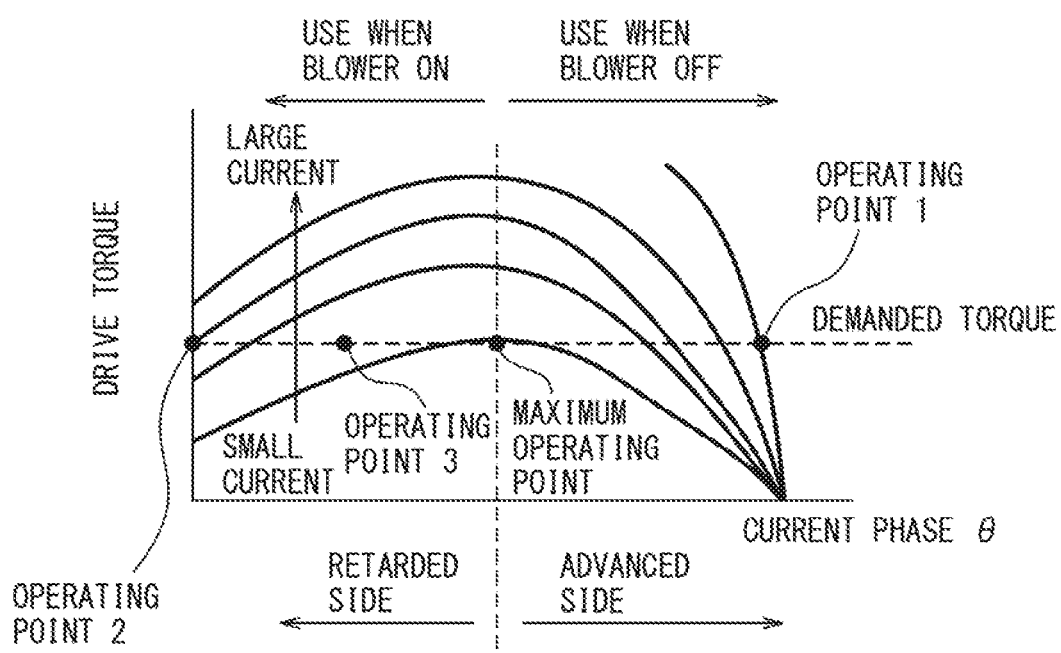
FIG. 6 is a view showing operating points when performing the control of FIG. 5.

FIG. 5 is a graph showing a change along with time from when heating is demanded relating to an amount of heat which the drive motor 2b supplies by its heat generation to the refrigerant of the refrigeration circuit 120, temperature inside the compartment, and current phase θ. Further, FIG. 6, in the same way as FIG. 4, is a graph showing the relationship between the drive torque of the drive motor 2b of the compressor 2 (ordinate) and the current phase θ of the current flowing through the drive motor 2b (abscissa) and shows the operating points in the case of control of FIG. 5. FIG. 5 and FIG. 6 show the case where the demanded torque demanded to the drive motor 2b of the compressor 2 is constant (in FIG. 6, demanded torque shown by broken line).

In FIG. 5, if heating is demanded at the time to, the blower motor 61a is set to the off state until the time $t_1$ when the refrigeration temperature rises to an extent where the refrigeration circuit 120 starts functioning. At the time $t_1$ and on, the blower motor 61a is set to the on state. That is, after being set to the off state, the blower motor 61a is set to the on state in accordance with the temperature rise of the refrigerant. Note that, the time to may also be the startup time of the vehicle (when ignition switch is turned on). From the time $t_0$ to the time $t_1$ when the blower motor 61a is in the off state, the drive motor 2b of the compressor 2 is made to output the demanded torque while control is performed to shift the current phase θ to the advanced side from the optimum phase θ. Specifically, from the time $t_0$ to the time $t_1$, the drive motor 2b is controlled at the operating point 1 shown in FIG. 6. Due to this, the electric power which the drive motor 2b consumes becomes larger.

As a result, the temperature of the refrigerant rises and, as shown in FIG. 5, a large amount of heat is supplied from the drive motor 2b to the refrigerant of the refrigeration circuit 120. When the blower motor 61a is in the off state, air is not discharged from the vents of the air passage 6, so fluctuation of the drive torque of the drive motor 2b is allowed. Regarding the temperature inside the compartment, from the time $t_0$ to the time $t_1$, the blower motor 61a is in the off state, so the temperature inside the compartment does not change from the time of heating demand (time to).

At the time $t_1$ and on, if the blower motor 61a becomes the on state, control is performed to shift the current phase θ to the retarded side from the optimum phase θ in the state holding the demanded torque. Specifically, at the time $t_1$ and on, the drive motor 2b is controlled at the operating point 2 shown in FIG. 6, then the drive motor 2b is controlled through the operating point 3 and finally the maximum operating point. At the operating point 2, the current value becomes smaller than the operating point 1. At the operating point 3, the current value becomes further smaller than the operating point 2.

As a result, as shown in FIG. 5, the amount of heat supplied from the drive motor 2b to the refrigerant of the refrigeration circuit 120 falls. On the other hand, at the time $t_1$ and on, the blower motor 61a is in the on state, so the inside of the passenger compartment is heated and the temperature inside the compartment rises to the set temperature. At this time, by controlling the drive motor 2b at the retarded side, the precision of control of the drive torque rises and fluctuation of the drive torque of the compressor 2 is suppressed, so controllability of the temperature inside the compartment rises and the temperature inside the compartment can be controlled to the set temperature.

Note that, the timing of the time $t_1$ for turning on the blower motor 61a to the on state may also be determined by the refrigerant temperature which the temperature sensor 16 detects. For example, the blower motor 61a is turned on and control is performed to shift the current phase to the retarded side at the point of time when the refrigerant temperature exceeds a predetermined value.

In the above way, when changing control of the inefficient drive operation in accordance with the on/off state of the blower motor 61a to control the current phase θ to the advanced side, the temperature of the refrigerant can be made to rise early. Further, if controlling the current phase θ to the retarded side, it becomes possible to suppress fluctuation of the temperature of the air discharged from the vents of the air passage 6. Further, when shifting the current phase θ to the advanced side, basically, fine advanced control becomes required for control of the drive torque, but the blower motor 61a can be set to the off state to avoid complication of the control structure and the manufacturing cost can be kept down.

Figure 7:
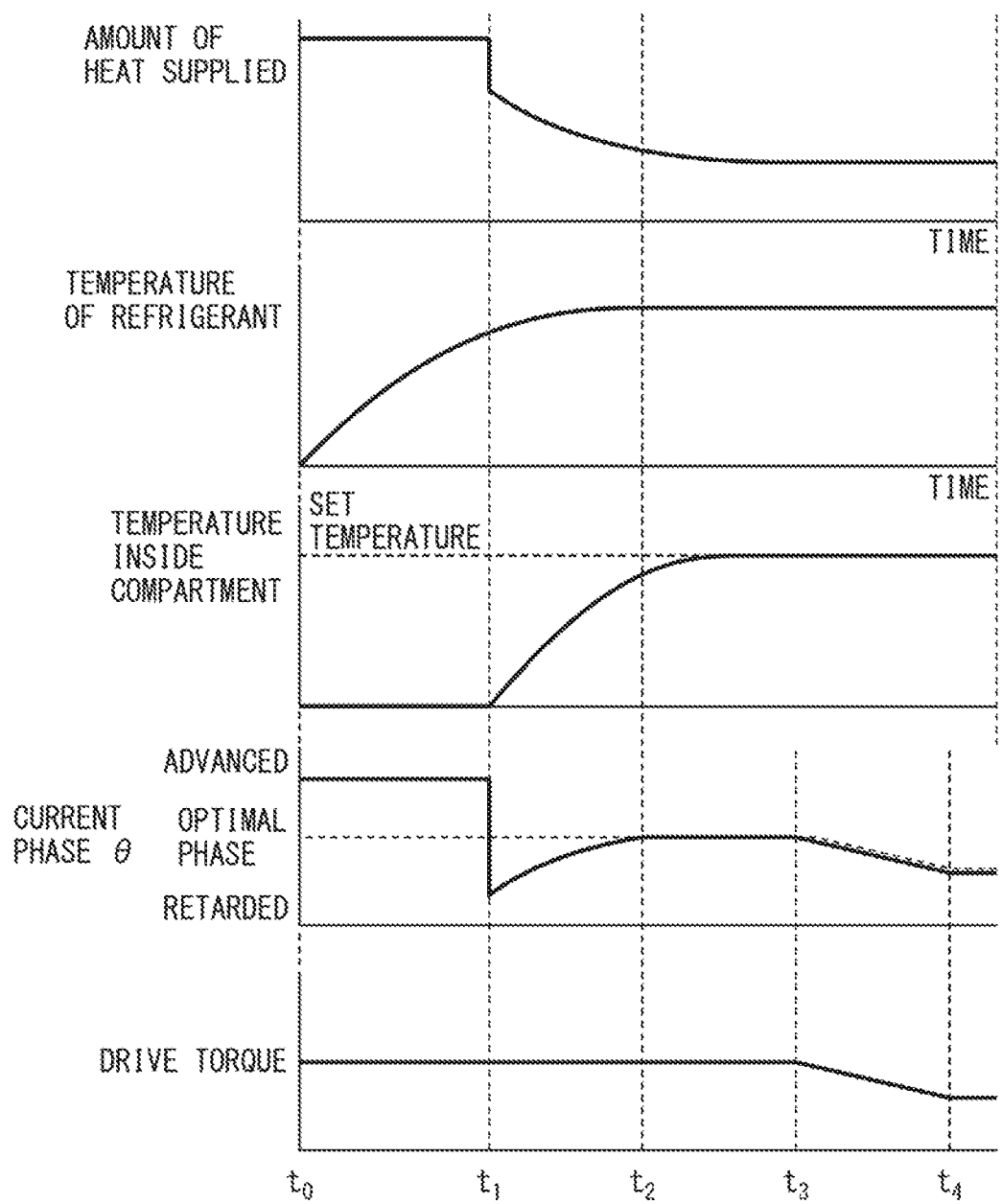
FIG. 7 is a graph showing a change along with time from the time of heating demand relating to an amount of heat which the drive motor supplies to the refrigerant, the refrigerant temperature of the refrigeration circuit, temperature inside a compartment, current phase θ, and drive torque.
Figure 8:
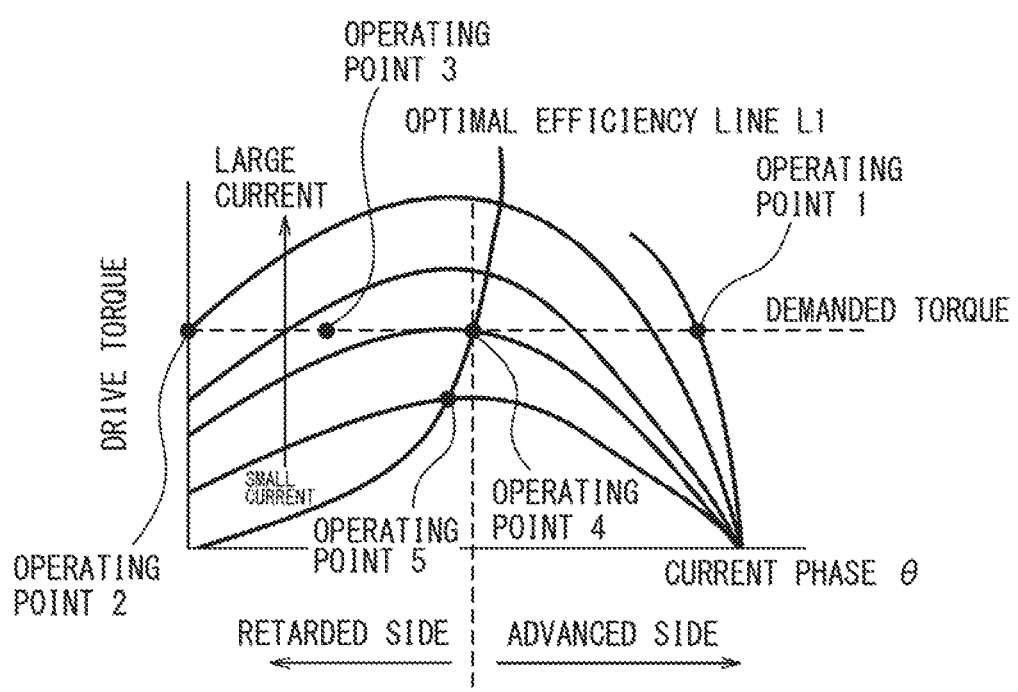
FIG. 8 is a view showing operating points when performing the control of FIG. 7.

Next, based on FIG. 7 and FIG. 8, the processing for ending the inefficient drive operation of the drive motor 2b and returning to a normal drive operation will be explained. FIG. 7 is a graph showing a change along with time from the time of heating demand relating to an amount of heat which the drive motor 2b supplies to the refrigerant of the refrigeration circuit 120 by its generation of heat, the temperature of the refrigerant of the refrigeration circuit 120, the temperature inside the compartment, the current phase θ, and drive torque of the drive motor 2b. Further, FIG. 8, in the same way as FIG. 4, is a graph showing the relationship between the drive torque of the drive motor 2b of the compressor 2 (ordinate) and the current phase θ of the current flowing through the drive motor 2b (abscissa) and shows the operating points in the case of control of FIG. 7. In the same way as FIG. 5, in FIG. 7 as well, if heating demand arises at the time to, the blower motor 61a is set to the off state until the time $t_1$. At the time $t_1$ and on, the blower motor 61a is set to the on state.

From the time $t_1$ to the time $t_1$ when the blower motor 61a is in the off state, control is performed to shift the current phase θ to the advanced side from the optimum phase θ in the state maintaining the demanded torque. Specifically, from the time $t_0$ to the time $t_1$, the drive motor 2b is controlled at the operating point 1 shown in FIG. 8. Due to this, the electric power which the drive motor 2b consumes becomes larger.

As a result, as shown in FIG. 7, a large amount of heat is supplied from the drive motor 2b to the refrigerant of the refrigeration circuit 120 and the refrigerant temperature rises. If the blower motor 61a is in the off state, air is not blown out from the vents of the air passage 6, so fluctuation of the drive torque of the drive motor 2b is allowable. Regarding the temperature inside the compartment, from the time $t_0$ to the time $t_1$, the blower motor 61a is in the off state, so the temperature inside the compartment does not change from the heating demand (time to).

If at the time $t_1$ on, the blower motor 61a becomes the on state, in the interval from the time $t_1$ to the time 12, control is performed to shift the current phase θ to the retarded side from the optimum phase $θ_0$ in the state maintaining the demanded torque. Specifically, from the time $t_1$ to the time $t_2$, the current phase θ and current value are made to change while the drive motor 2b is controlled in the order of the operating point 2, operating point 3, and operating point 4 shown in FIG. 8. The current value becomes smaller in the order of the operating point 2, operating point 3, and operating point 4. The degree of drop in motor efficiency in the inefficient drive operation becomes smaller in that order. At the time 12, the current phase θ and current value reach the operating point 4 on the optimum efficiency line L1 whereupon the drive state of the drive motor 2b is returned from the inefficient drive operation to a normal drive operation.

As a result, as shown in FIG. 7, the amount of heat supplied from the drive motor 2b to the refrigerant of the refrigeration circuit 120 falls and the refrigerant temperature gently rises. On the other hand, at the time $t_1$ on, since the blower motor 61a is the on state, the inside of the passenger compartment is heated and the temperature inside of the passenger compartment rises toward the set temperature. At this time, by driving the drive motor 2b at the retarded side, the precision of control of the drive torque becomes higher and torque fluctuation of the compressor 2 is suppressed, so the controllability of the temperature inside the compartment can be raised. Due to the above, control is performed so that the degree of drop of the motor efficiency at the time of the inefficient drive operation becomes smaller at a timing when the amount of heat required to be supplied to the refrigerant falls (timing when refrigerant temperature rises).

At the time $t_2$ and on, processing is performed to lower the drive torque by a normal drive operation. Specifically, at the time $t_2$ and on, the current phase θ and current value are changed while controlling drive motor 2b at the operating point 4 and operating point 5 in the order shown in FIG. 8. That is, at the time $t_2$, the current phase θ reaches the operating point 4 on the optimum efficiency line L1 where the normal drive operation is returned to, then the drive motor 2b is controlled at the operating point 4 until the time $t_3$. After that, at the times $t_3$ to $t_4$, the torque demanded from the drive motor 2b falls. Along with the drop in the demanded torque, the current value and current phase θ are changed on the optimum efficiency line L1 so that the drive torque falls. At the time $t_4$, the operating point 5 is reached. At the maximum operating point, the change in the drive torque with respect to the change in current phase becomes extremely small, so the precision of control of the drive torque of the drive motor 2b rises more. Accordingly, the controllability of the temperature inside the compartment further rises and the temperature inside the compartment can be held at the set temperature. In this way, at the time $t_2$ and on, the refrigerant temperature sufficiently rises, so control is performed to perform a normal drive operation on the optimum efficiency line L1 and lower the drive torque without performing an inefficient drive operation.

Note that, in FIG. 5 and FIG. 7, the example is shown where the blower motor 61a is set to the off state at the point of time when heating is demanded and where the blower motor 61a is set to the on state along with the rise of the refrigerant temperature (example of auto A/C), but the present embodiment can also be applied to the case where an occupant manually operates the A/C. In the case of manual operation, control of the inefficient drive operation is changed in accordance with the on/off state of the blower motor 61a. For example, if the blower motor 61a is set to the on state by manual operation by an occupant at the time of heating demand, control is performed to shift the current phase θ to the retarded side from the optimum phase $θ_0$.

Control of Vehicle-Mounted Temperature Controller

Figure 9:
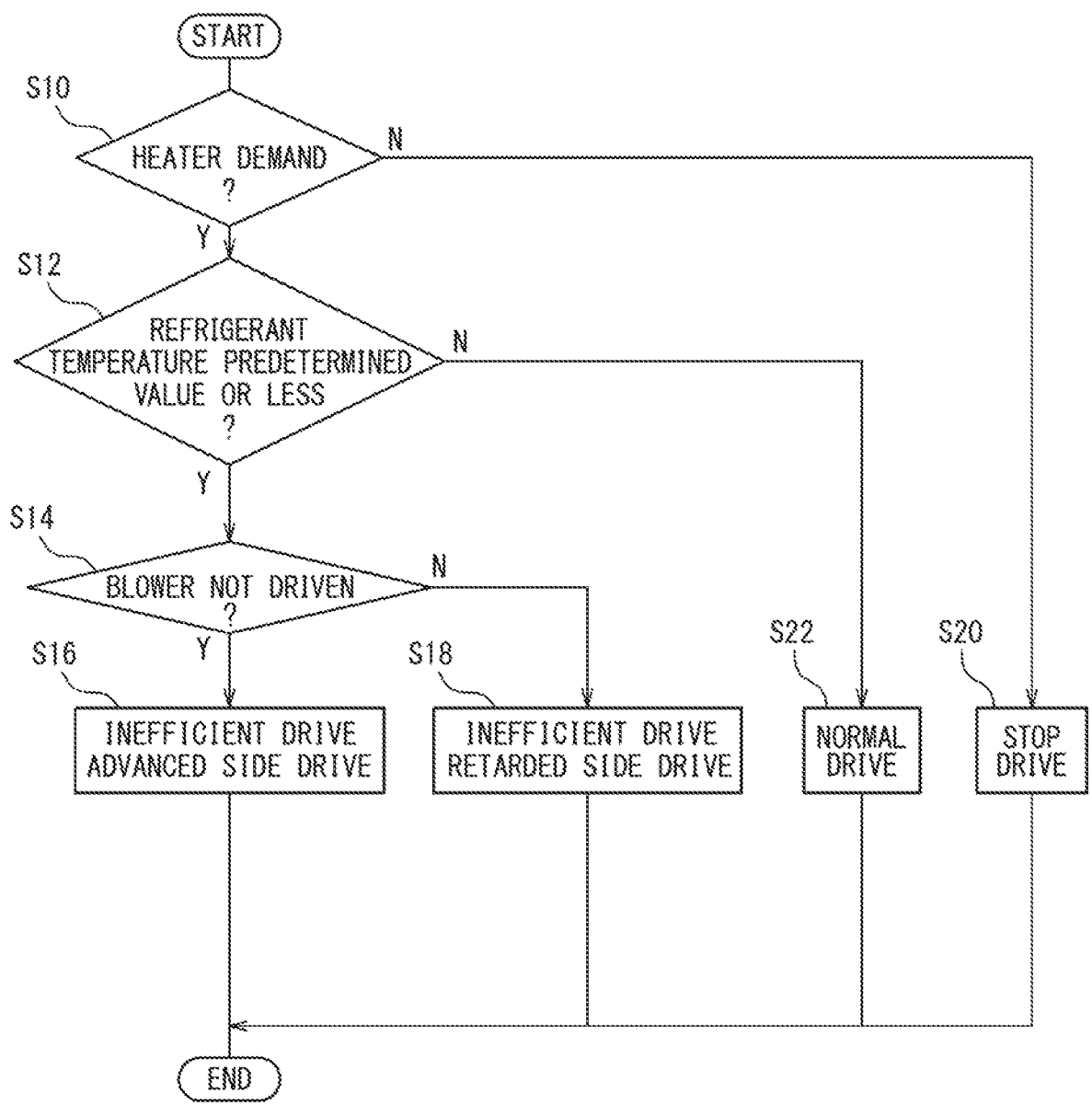
FIG. 9 is a flow chart showing one example of a control routine controlling a vehicle-mounted temperature controller of the present embodiment.

FIG. 9 is a flow chart showing one example of a control routine for controlling the vehicle-mounted temperature controller 100 of the present embodiment. The illustrated control routine is executed by the ECU 51 every certain time interval. First, based on an operation signal from the air-conditioner control panel etc., it is judged if there is heater demand (heating) by the vehicle-mounted temperature controller 100 (step S10). If there is heater demand, it is judged if the refrigerant temperature is a predetermined value or less based on the detection value of the temperature sensor 16 (step S12). If there is no heater demand, the drive motor 2b of the compressor 2 is stopped (step S20). Further, if the refrigerant temperature is over the predetermined value, the drive motor 2b of the compressor 2 is driven as usual (step S22) and the processing is ended (END).

If the refrigerant temperature is the predetermined value or less, the drive motor 2b of the compressor 2 driven by an inefficient drive operation. At this time, it is judged if the blower motor 61a is in the off state (step S14). If the blower motor 61a is in the off state, the current phase of the drive motor 2b of the compressor 2 is shifted to the advanced side from the optimum phase $θ_0$ to perform an inefficient drive operation (step S16). Further, if the blower motor 61a is in the on state, the current phase of the drive motor 2b of the compressor 2 is shifted to the retarded side from the optimum phase θo to perform an inefficient drive operation (step S18).

In this way, according to the processing of FIG. 9, when performing heating by the vehicle-mounted temperature controller 100, if the refrigerant temperature is falling, the drive motor 2b of the compressor 2 is driven by an inefficient drive operation. At this time, the current phase of the drive motor 2b of the compressor 2 is controlled to the advanced side or retarded side based on the on/off state of the blower motor 61a. When the blower motor 61a is in the on state, the current phase can be controlled to the advanced side to increase the amount of heat supplied to the refrigeration circuit 120. Further, when the blower motor 61a is in the off state, the current phase can be controlled to the retarded side to raise the temperature controllability. Therefore, it becomes possible to optimally adjust the temperature based on the on/off state of the blower motor 61a.

Figure 10:
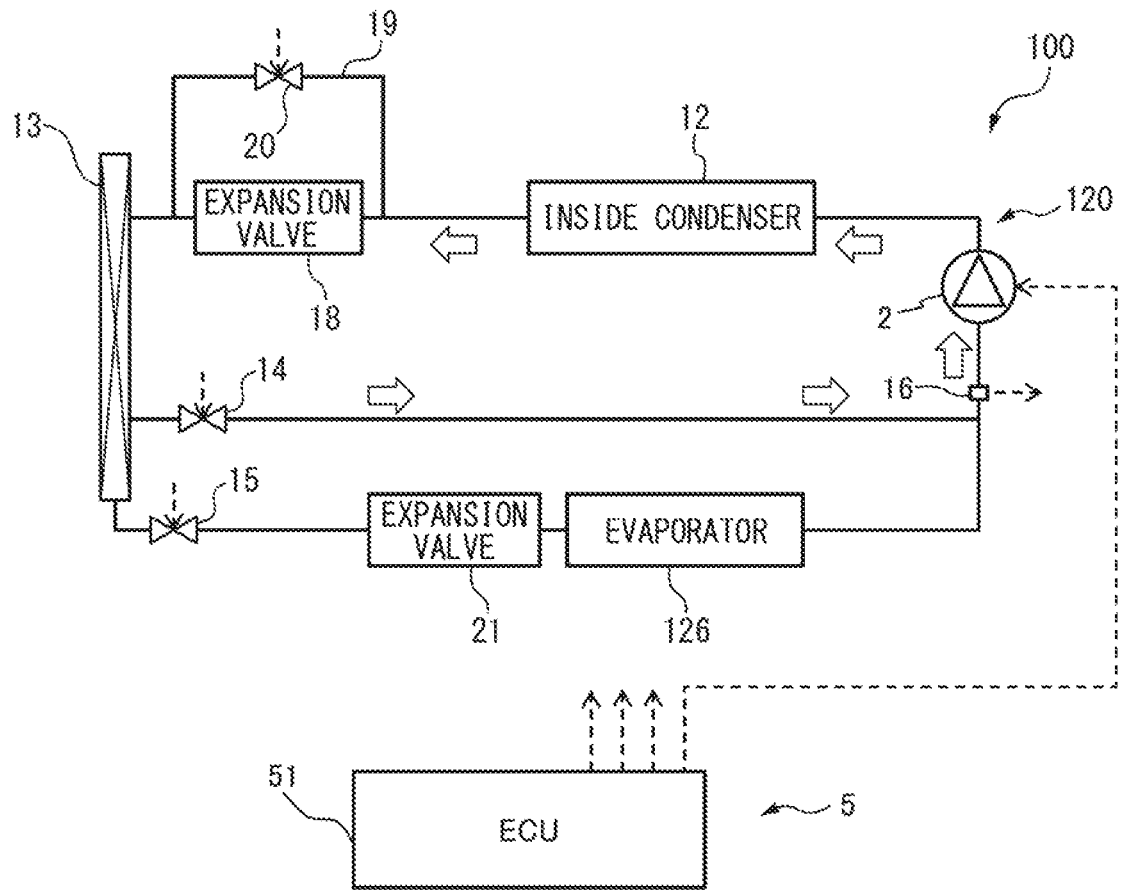
FIG. 10 is a view of the configuration schematically showing a vehicle-mounted temperature controller configured from a refrigeration circuit.

Application to Vehicle-Mounted Temperature Controller Configured from Refrigeration Circuit Next, referring to FIG. 10, application to the vehicle-mounted temperature controller 100 configured using the refrigeration circuit 120 will be explained. FIG. 10 is a view of the configuration schematically showing the vehicle-mounted temperature controller 100 configured using the refrigeration circuit 120.

As shown in FIG. 10, the refrigeration circuit 120 is comprised of the compressor 2, inside condenser (heat exchanger) 12, heating use expansion valve 18, bypass piping 19, bypass valve 20, outdoor heat exchanger 13, solenoid valve 14, solenoid valve 15, cooling use expansion valve 21, evaporator 126, and refrigerant piping connecting these components in a ring.

Figure 11:
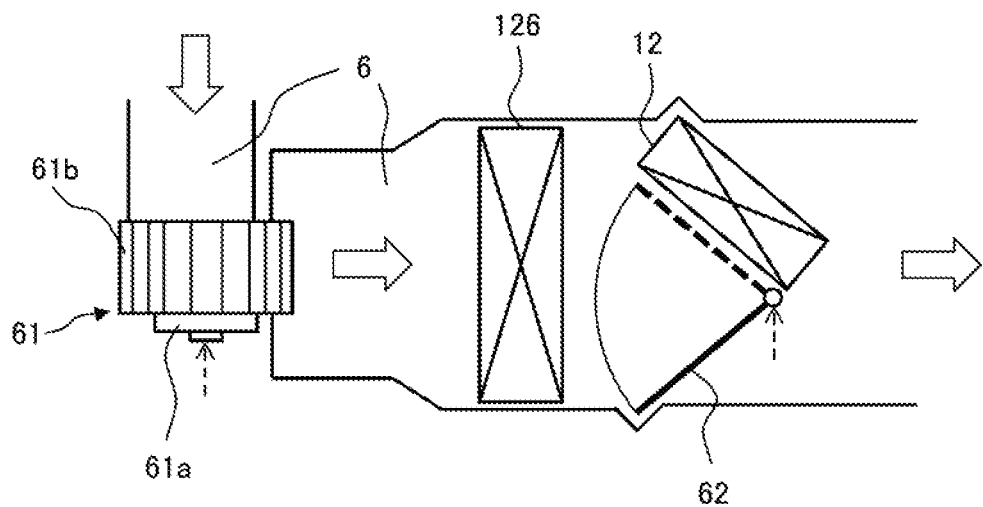
FIG. 11 is a view of the configuration schematically showing an air passage for air-conditioning a vehicle mounting the vehicle-mounted temperature controller shown in FIG. 10.

FIG. 11 is a view of the configuration schematically showing an air passage 6 for air conditioning of the vehicle mounting the vehicle-mounted temperature controller 100 shown in FIG. 10. As shown in FIG. 11, the air passage 6 for air conditioning is provided with the blower 61, evaporator 126, air mix door 62, and inside condenser 12 in that order in the direction of flow of air. The evaporator 126 cools the air flowing through the air passage 6. The inside condenser 12 is provided instead of the heater core 145 shown in FIG. 2 and heats the air passing through the evaporator 126. Note that, the rest of the configuration of FIG. 11 besides the inside condenser 12 is similar to FIG. 2.

The inside condenser 12 is arranged at the downstream side in the direction of flow of air from the evaporator 126 inside the air passage 6 shown in FIG. 11. The inside condenser 12 heats the air passing through the inside of the air passage 6 by heat exchange with the refrigerant gas flowing from the compressor 2.

The outdoor heat exchanger 13 exchanges heat between the refrigerant flowing through the inside and the outside air. Note that, the outdoor heat exchanger 13 acts as a heat absorber absorbing heat from the outside air at the time of the heating operation mode and acts as a heat emitter discharging heat to the outside air in the cooling operation mode.

The solenoid valves 14 and 15 are valves for changing the flow path of the refrigerant from the outdoor heat exchanger 13 to the compressor 2. If the solenoid valve 14 is opened and the solenoid valve 15 is closed, the refrigerant bypasses the cooling use expansion valve 21 and evaporator 126 and is sent to the compressor 2. Further, if the solenoid valve 14 is closed and the solenoid valve 15 is opened, the refrigerant passes through the cooling use expansion valve 21 and evaporator 126 and is sent to the compressor 2.

The heating use expansion valve 18 and cooling use expansion valve 21 function as an expander making the refrigerant expand. These expansion valves 18 and 21 are provided with narrow diameter passages and spray refrigerant from these narrow diameter passages to make the pressure of the refrigerant rapidly fall. The heating use expansion valve 18 reduces the pressure of the liquid refrigerant supplied from the inside condenser 12 in accordance with the valve opening degree and sprays it to the inside of the outdoor heat exchanger 13 atomized. Note that, these valves are controlled by the actuators.

In the example of the configuration shown in FIG. 10, in the heating operation mode, the refrigerant flowing out from the outdoor heat exchanger 13 is made to bypass the cooling use expansion valve 21 to be sent to the compressor 2, so the solenoid valve 14 is opened and the solenoid valve 15 is closed. Further, in the heating operation mode, the bypass valve 20 is closed. Due to this, refrigerant circulates by the path shown by the arrows in FIG. 10.

In the heating operation mode, the refrigerant supplied to the inside of the outdoor heat exchanger 13 absorbs heat from the outside air and becomes a gas. Further, the refrigerant supplied from the outdoor heat exchanger 13 is compressed by the compressor 2. The high temperature high pressure refrigerant compressed by the compressor 2 exchanges and discharges heat with the air flowing through the inside of the air passage 6 when passing through the inside condenser 12. Due to this, the air flowing through the inside of the air passage 6 rises in temperature and is blown out from the vents to the inside of the passenger compartment whereby the inside of the passage compartment is heated so that the temperature of the inside of the passenger compartment becomes a desired set temperature.

The inside condenser 12 functions as a condenser condensing the refrigerant in the refrigeration cycle. In the inside condenser 12, the high temperature and high pressure mainly gaseous refrigerant flowing out from the compressor 2 is cooled isobarically whereby it is made to change to a high temperature and high pressure mainly liquid refrigerant. The refrigerant becoming a liquid by exchange of heat with the air inside the air passage 6 is supplied to the heating use expansion valve 18. The heating use expansion valve 18 makes the pressure of the refrigerant rapidly fall for supply to the outdoor heat exchanger 13. In the heating operation mode, the outdoor heat exchanger 13 functions as an evaporator making the refrigerant evaporate. In the outdoor heat exchanger 13, the low temperature and low pressure atomized refrigerant flowing out from the heating use expansion valve 18 evaporates whereby it is made to change to a low temperature and low pressure gaseous refrigerant.

In the example of configuration shown in FIG. 10 as well, in the same way as the example of the configuration of FIG. 1, in an environment with a temperature of the refrigerant so low that the refrigeration cycle cannot be suitably realized, the drive motor 2b of the compressor 2 is driven by an inefficient drive operation so as to make the temperature of the refrigerant rise early. By driving the drive motor 2b by an inefficient drive operation, the temperature of the refrigerant of the refrigeration circuit 120 can be made to rise in a short time. By the temperature of the refrigerant rising early, it becomes possible to suitably realize the refrigeration cycle in the refrigeration circuit 120 early and accordingly it becomes possible to heat the inside of the passenger compartment early.

Further, in the example of the configuration shown in FIG. 10 as well, in the same way as the example of the configuration of FIG. 1, in the state where the blower motor 61a is off, the current phase $\theta$ is controlled so as to be shifted from the optimum phase $\theta$ to the advanced side, while in the state where the blower motor 61a is on, the current phase $\theta$ is controlled so as to be shifted from the optimum phase $\theta_0$ to the retarded side. Due to this, when the current phase $\theta$ is shifted to the advanced side, control can be performed giving priority to raising the temperature of the refrigerant while when the current phase $\theta$ is shifted to the retarded side, control can be performed giving priority to the controllability of the temperature.

Note that, in the configuration shown in FIG. 10, in the cooling operation mode, the refrigerant flowing out from the outdoor heat exchanger 13 is sent to the cooling use expansion valve 21 and evaporator 126, so the solenoid valve 15 is opened and the solenoid valve 14 is closed. Further, in the cooling operation mode, the bypass valve 20 is opened. The cooling use expansion valve 21 reduces the liquid refrigerant supplied from the inside condenser 12 through the outdoor heat exchanger 13 in pressure in accordance with valve opening degree and sprays it inside the evaporator 126 atomized. The evaporator 126 functions as a heat absorber absorbing heat from air blown inside the air passage 6 to the refrigerant. The evaporator 126 makes the low temperature and low pressure atomized refrigerant flowing out from the cooling use expansion valve 21 evaporate and vaporize by heat exchange with the air blown into the air passage 6 by the blower fan 61b to change it to a low temperature and low pressure gaseous refrigerant for supply to the compressor 2. As a result, the air around the evaporator 126 can be made to cool and the inside of the passenger compartment can be cooled.

Further, in the cooling operation mode, the opening degree of the air mix door 62 is controlled to be fully closed. Due to this, the air flowing through the inside of the air passage 6 bypasses the inside condenser 12, so when the high temperature and high pressure refrigerant discharged from the discharge port 2f of the compressor 2 passes through the inside condenser 12, it does not discharge heat to the air flowing through the inside of the air passage 6. Therefore, the air cooled when passing through the evaporator 126 flows through the inside of the air passage 6 so as to bypass the inside condenser 12 and is blown out from the vents to the inside of the passenger compartment. Due to this, the inside of the passenger compartment is cooled so that the temperature of the inside of the passenger compartment becomes a desired set temperature.

As explained above, according to the present embodiment, by lowering the efficiency of the drive motor 2b of the compressor 2 to introduce heat into the refrigeration circuit 120, the refrigerant temperature and refrigerant density rises and the refrigeration circuit 120 can be suitably operated at the time of a low temperature. At this time, by driving the drive motor 2b by an inefficient drive operation at the advanced side while the blower motor 61a is in the off state and driving the drive motor 2b by an inefficient drive operation at the retarded side while the blower motor 61a is in the on state, it becomes possible to secure the required amount of heat early while keeping down fluctuation of the drive torque of the compressor 2 and stabilizing the temperature inside of the passenger compartment.

The invention claimed is:

1. A vehicle-mounted temperature controller of a vehicle, comprising:
  a compressor having a compression part that drives a refrigerant and a drive motor that drives the compression part and uses waste heat accompanying driving of the drive motor to cause a temperature of the refrigerant to rise,
  a blower that blows air to a heat exchanger raised in temperature by receiving heat of the refrigerant and blows air exchanged in heat with the heat exchanger to an inside of a passenger compartment of the vehicle, wherein the blower turns on when the temperature of the refrigerant exceeds a predetermined value, and
  an electronic control unit configured to:
  control a current phase of the drive motor to a phase by which a ratio of change of an output of the drive motor to a change of the current phase increases to thereby drive the drive motor by an inefficient drive operation when the blower is in a nondriven state and control the current phase to a phase by which the ratio of change of the output of the drive motor to the change of the current phase decreases to thereby drive the drive motor by an inefficient drive operation when the blower is in a driven state.

2. The vehicle-mounted temperature controller according to claim 1, wherein
  the electronic control unit is further configured to drive the drive motor by the inefficient drive operation by controlling the current phase of the drive motor to an advanced side from the optimum phase when the blower is in the nondriven state and controlling the current phase of the drive motor to a retarded side from the optimum phase when the blower is in the driven state and
  the optimum phase is a phase by which an output of the drive motor can satisfy a demanded torque of the compressor while the current supplied to the drive motor can be minimized.

3. The vehicle-mounted temperature controller according to claim 2, wherein the blower is set to the nondriven state at the time of heating demand, then is set to the driven state in accordance with a temperature rise of the refrigerant.

4. The vehicle-mounted temperature controller according to claim 2, wherein the electronic control unit makes the current phase of the drive motor approach the optimum phase after controlling it to the retarded side from the optimum phase.

5. The vehicle-mounted temperature controller according to claim 1, wherein, when performing the inefficient drive operation, the electronic control unit supplies, to the drive motor, a current larger than a smallest current value in the currents supplied to the drive motor by which the output of the drive motor can satisfy a demanded torque of the compressor.

6. The vehicle-mounted temperature controller according to claim 1, further comprises further comprising a temperature detector detecting the temperature of the refrigerant, and
  wherein the electronic control unit inefficiently drives the drive motor while the temperature of the refrigerant is the predetermined value or less.

7. The vehicle-mounted temperature controller according to claim 6, wherein the electronic control unit drives the drive motor by the inefficient drive operation ilewh the temperature of the refrigerant is the predetermined value or less and there is heating demand.

8. The vehicle-mounted temperature controller according to claim 1, wherein the compressor is configured to exchange heat between one of (i) the drive motor or (ii) a heat emitting part emitting heat along with driving of the drive motor, and the refrigerant.

* * * * *